United States Patent [19]

Miller et al.

[11] Patent Number: 4,517,828
[45] Date of Patent: May 21, 1985

[54] APPARATUS FOR LEAK TESTING OF PIPE

[75] Inventors: Darwin L. Miller; Ronnie F. Miller, both of Houma, La.

[73] Assignee: Damco Testers, Inc., Houma, La.

[21] Appl. No.: 508,464

[22] Filed: Jun. 28, 1983

[51] Int. Cl.³ .............................................. G01M 3/08
[52] U.S. Cl. ......................................... 73/46; 73/45.5
[58] Field of Search .......................... 73/46, 45.5, 49.5

[56] References Cited

U.S. PATENT DOCUMENTS

| 1,273,914 | 7/1918 | O'Sullivan . | |
|---|---|---|---|
| 2,255,921 | 9/1941 | Fear . | |
| 2,264,515 | 12/1941 | Fear . | |
| 2,287,340 | 6/1942 | Browall . | |
| 2,587,192 | 2/1952 | Meyer . | |
| 2,745,279 | 5/1956 | Collins et al. . | |
| 2,761,311 | 9/1956 | Baker . | |
| 2,766,613 | 10/1956 | Williams . | |
| 3,358,497 | 12/1967 | Hauk . | |
| 3,385,103 | 5/1968 | Wilkerson . | |
| 4,194,389 | 3/1980 | Laging .............................. | 73/49.5 X |

FOREIGN PATENT DOCUMENTS

| 504638 | 4/1939 | United Kingdom ..................... 73/46 |
| 1410584 | 10/1975 | United Kingdom . |
| 1497440 | 1/1978 | United Kingdom . |
| 1551757 | 8/1979 | United Kingdom . |
| 2055210 | 2/1981 | United Kingdom . |
| 2056091 | 3/1981 | United Kingdom . |
| 2058362 | 4/1981 | United Kingdom . |
| 2123556 | 2/1984 | United Kingdom . |
| 2129948 | 5/1984 | United Kingdom . |

Primary Examiner—Howard A. Birmiel
Assistant Examiner—Joseph W. Roskos
Attorney, Agent, or Firm—Fleit, Jacobson, Cohn & Price

[57] ABSTRACT

An enclosure to define a substantially annular chamber around a conduit to be tested for leakage, and to confine a liquid to permit the visual detection of gas bubbles indicative of a gas leak in the conduit. The enclosure is sleeve-like and includes two body members pivotable about a longitudinal hinge to permit quick attachment to and removal from a pipe section. A longitudinal seal is provided and a radial seal extends from corresponding ends of the body members to define the bottom wall of the enclosure and to sealingly engage the pipe.

13 Claims, 3 Drawing Figures

APPARATUS FOR LEAK TESTING OF PIPE

BACKGROUND OF THE INVENTION

1. Field of the Invention

This invention relates to apparatus for use in leak testing of pipe joints by means of a pressurized test gas, and more particularly to an enclosure device for confining liquid around a pipe joint to permit the visual detection of test gas that leaks through the joint.

2. Description of the Prior Art

The testing of fluid conduits for leak tightness is a common requirement, especially in the oil and gas well field. In the oil field, the testing of pipe joints is especially important to prevent leakage of the gas or oil out of the pipe and loss into the surrounding ground around the bore hole. Typically in such applications, a hole is drilled in the earth, and as the depth of the hole increases, a well casing, in the form of a pipe, is inserted behind the drill to define the wall bore and to permit the introduction and withdrawal of drilling fluids, as well as the withdrawal of drilling debris. Several sections of such a well casing are referred to as a well string, and the string is defined by a series of interconnected pipe sections, the interconnections most often being accomplished by means of an internally threaded union which engages corresponding external threads at each of the opposed ends of the pipe sections to be joined.

Testing of such pipe joints for leak tightness has most often been accomplished by subjecting the pipe joint to high internal fluid pressures. A suitable pipe testing tool is introduced into the interior of the pipe, the tool being such that it includes spaced resilient packing glands which are radially outwardly expandable against the interior surface of the pipe on opposite sides of the area to be tested to thereby define a confined annular space into which a pressurized liquid, such as water, can be introduced. Any leakage of water through the joint can then be visually detected, whereupon suitable corrective action can be taken.

In addition to the use of pressurized water, it has become the preferred practice when testing pipe for the deeper wells to employ pressurized gases, specifically nitrogen gas, to check pipe joints for leak tightness because the gases are capable of passing through, and thereby exposing, smaller leak sites than is water. This is particularly true for testing leak tightness at pressures in excess of about 10,000 psi. When pressurized nitrogen or another test gas is used, a cup-like member is positioned around and under the exterior of the joint section to be tested, which tightly engages the section of pipe immediately below the test section to define an external annular chamber open at the top and closed at the bottom. Water is placed in the annular chamber, and a leak manifests itself by the appearance of gas bubbles rising in the surrounding water, which can be visually detected. An example of such a "bubble bucket" is shown in U.S. Pat. No. 3,385,103, issued May 28, 1968, to John F. Wilkerson. However, the Wilkerson device is a cylinder that has a continuous sidewall and openings at each end. Therefore that device cannot be removed from a pipe in a lateral direction, but must be moved axially along the pipe until the end of the pipe is reached, and thus removal of the Wilkerson device from a pipe string is cumbersome and inconvenient. Also, the Wilkerson device requires the use of a flexible sealing disk, formed of rubber or other flexible material, to allow relative movement between the disk and the pipe while maintaining a seal and to permit passage of a pipe joint therethrough.

It is desirable that an improved leak test enclosure be provided which is more convenient to use and which can be rapidly applied to or removed from the pipe connection to be tested. It is also desirable that an improved leak test enclosure be provided which does not require specially designed sliding seals and the like.

SUMMARY OF THE INVENTION

It is an object of the present invention to provide an improved leak test enclosure for sensing leaking test gas at a pipe joint.

A further object of the present invention is to provide a leak test enclosure which is readily removable from a test section of a pipe string and which can be quickly positioned about another test section.

Still a further object of the present invention is to provide a leak test enclosure which is readily positioned about and removed from pipe test sections and which can also accommodate different pipe diameters.

Briefly stated, in accordance with one aspect of the present invention, an enclosure is provided for confining a liquid adjacent a test area in a fluid carrying conduit for visual detection of pressurized test gas that has leaked through the test area. The enclosure includes a sleeve positionable about the fluid carrying conduit and in surrounding relationship with a test area. The sleeve includes a pair of elongated body members hingedly connected to define a longitudinally openable sleeve. Sealing means are carried by the sleeve to engage the conduit around one side of the test area and in liquid tight relationship therewith. Retaining means are carried by the sleeve to retain the enclosure around the test area to define an annular chamber for confining a liquid therewithin.

DESCRIPTION OF THE PREFERRED EMBODIMENTS

Figure 1:
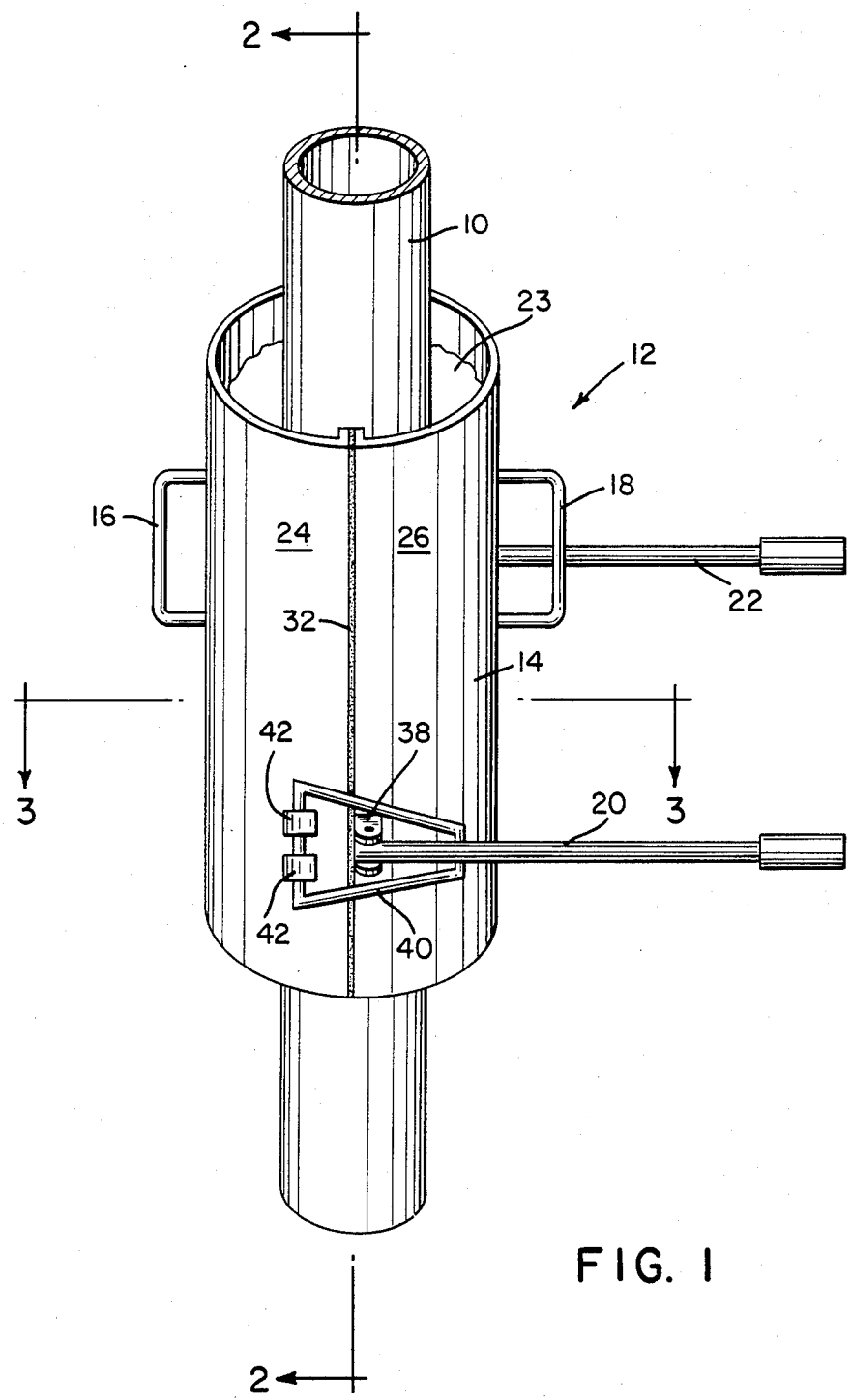
FIG. 1 is a fragmentary perspective view of a well casing including a surrounding enclosure in accordance with the present invention.

Referring now to the drawings, and particularly to FIG. 1 thereof, there is shown a section of a well casing in the form of a fluid conduit or pipe 10, a portion of which is surrounded by a leak test enclosure 12 in accordance with the present invention. Enclosure 12 is in the form of a generally tubular, sleeve-like body 14 which is split longitudinally to permit it to be opened and positioned around or removed from a test section at a joint in pipe 10, and includes a pair of carrying handles 16, 18, and a pair of supporting handles 20, 22. As shown, the enclosure contains a liquid 23, such as water, to surround the pipe joint and permit the visual detection of leaks when the interior of the pipe joint is subjected to gas under pressure.

Figure 3:
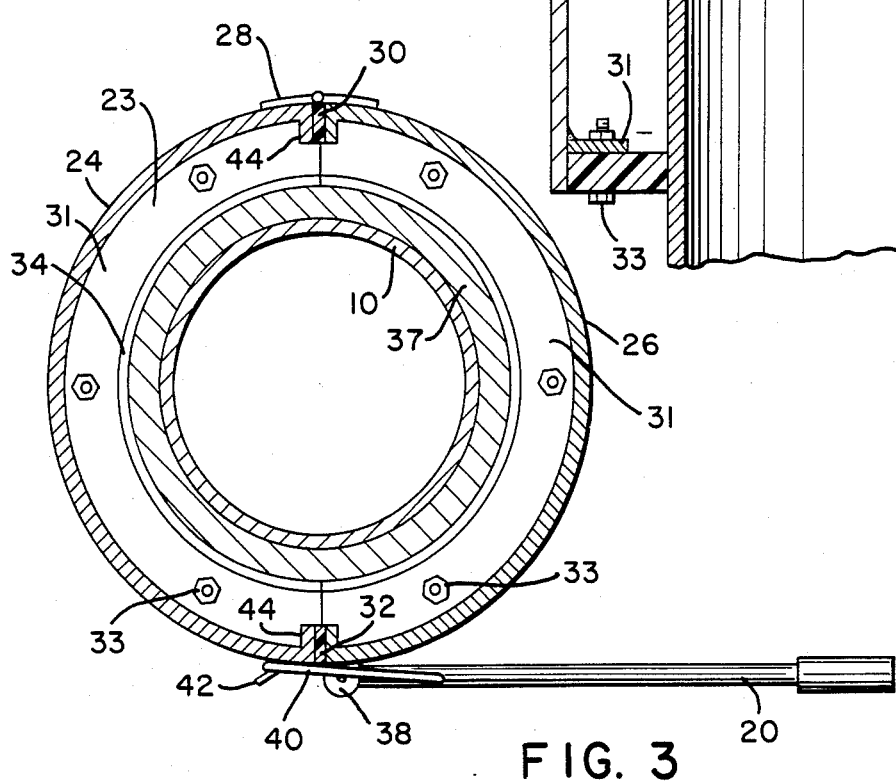
FIG. 3 is a transverse cross-sectional view taken along the line 3—3 of FIG. 1.

As best seen in FIGS. 1 and 3, sleeve 14 is defined by a pair of elongated body members 24 and 26 having an arcuate cross-section, which can be a circular arc as shown, but which can also be non-circular as long as the two body members 24 and 26 can be engaged along cooperating longitudinal edges to define sleeve 14. A longitudinal hinge 28 interconnects one pair of corresponding longitudinal edges of body members 24 and 26 so they can be pivoted about hinge 28 and thereby separated and opened to permit enclosure 12 to be rapidly applied to and removed from pipe 10 at any axial position thereof. A seal 30 is provided between the respective longitudinal edges of body members 24, 26 adjacent hinge 28. Another seal 32 is provided between the other longitudinal edges of body members 24, 26 radially opposite hinge 28. Seals 30 and 32 can be flexible strip seals formed from extruded or foamed rubber, polyurethane, or other elastomeric materials.

Figure 2:
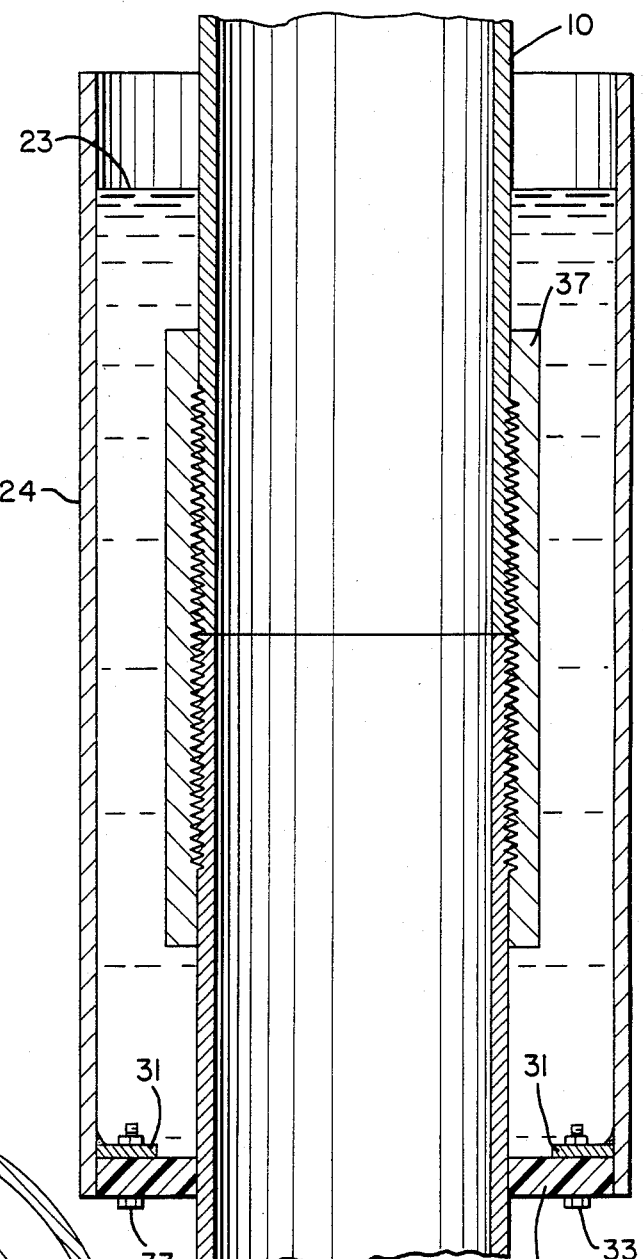
FIG. 2 is a longitudinal cross-sectional view taken along the line 2—2 of FIG. 1.

Referring now to FIG. 2, corresponding ends of each of body members 24, 26 include a transversely extending, semi-annular, inwardly directed, resilient seal or gasket 34, 36 (only one of which is visible in FIG. 2), that is adapted to sealingly engage with the outer surface of pipe 10 which, as shown, includes a union 37, and to provide a substantially liquid-tight seal between the pipe and enclosure 12 in order to retain the liquid at the area to be tested. Seals 34, 36, are elastomeric and can be formed from a natural or synthetic elastomer such as rubber or neoprene. As shown, seals 34, 36 cooperate to define an annular bottom wall that serves as the base for enclosure 12 when the same is in position around a pipe, and are substantially liquid impervious.

Each of body members 24 and 26 includes a semi-annular, inwardly directed reinforcing flange 31 that is welded to the respective body member adjacent one end and is positioned between the body member and the outer surface of pipe 10. Seals 34 and 36 are secured to the outwardly facing surfaces of flanges 31 as, for example, by means of bolts 33. Seals 34 and 36 are reinforced and supported by reinforcing flange 31 and the respective body member. Seals 34 and 36 are resilient in a radial direction relative to the longitudinal axis of pipe 10, and are of sufficient thickness so as to be substantially inflexible in an axial direction relative to the longitudinal axis of pipe 10.

A retaining means is provided for holding body members 24, 26 in locked, sealing engagement and is most clearly seen in FIGS. 1 and 3. Supporting handle 20 is pivotally secured to a yoke 38 which is carried by and extends outwardly from body member 26 intermediate the ends thereof. Handle 20 pivotally carries a locking loop 40, which is positioned on handle 20 radially outwardly of the pivot axis of yoke 38. Body member 24 includes one or more outwardly extending lugs 42 positioned opposite yoke 38. The adjacent longitudinal edges of body members 24, 26 are held in tight engagement after the retaining means is engaged by moving handle 20 toward body member 24, positioning loop 40 over lugs 42, and pivoting handle 20 toward body member 26 to the position shown in FIG. 1, whereupon the open longitudinal edges of body members 24, 26 are drawn together so that the seal therebetween is at least partially compressed to effect a substantially liquid-tight seal. The pivot axis of loop 40 on arm 20 is preferably spaced from yoke 38 a distance sufficient to cause the arm to be locked when the enclosure is in the closed condition.

Body members 24, 26 are preferably formed from a substantially liquid impermeable material, such as sheet metal, or plastics, such as tubular polyurethane, polyvinyl chloride, or the like. If desired, each of body members 24, 26 can include radially inwardly extending longitudinal flanges 44 (see FIG. 3) along the respective longitudinal edges thereof to provide a greater surface area against which seals 30 and 32 can act.

In operation, test enclosure 12 of the present invention is positioned about union 37 by spreading handles 16 and 18 to pivot body members 24 and 26 about hinge 28 until the longitudinal edges are separated a distance sufficient to permit the enclosure to be placed over the pipe section. Once enclosure 12 is in position, the body members are pivoted to a closed position so that seals 30 and 32 are compressed and provide a fluid tight seal. The locking means is actuated as hereinabove described and maintains the enclosure in a closed condition. The inner surfaces of inwardly directed seals 34 and 36 engage the outer surface of pipe 10 and thus enclosure 12 defines an annular container with pipe 10 and union 37 as the inner surface thereof.

After the enclosure is properly positioned relative to the joint, water is added to the annular space between the enclosure and the pipe, and the interior of pipe 10 adjacent the joint is pressurized by means of a high pressure test gas. If the joint is gas-tight, none of the pressurized test gas will leak into the annular chamber between the pipe joint and the enclosure. If a leak exists, then test gas will leak into the annular chamber and will appear as visually detectable gas bubbles in the water.

While particular embodiments of the present invention have been illustrated and described, it will be apparent to those skilled in the art that various changes and modifications can be made without departing from the spirit and scope of the invention, and it is intended to encompass within the appended claims all such changes and modifications which fall within the scope of the present invention.

What is claimed is:

1. An enclosure for confining a liquid adjacent a test area in a fluid carrying conduit, said enclosure comprising:
    (a) a sleeve positionable about a fluid carrying conduit in surrounding relationship with a test area, said sleeve including a pair of elongated body members hingedly connected to define a longitudinally openable sleeve;
    (b) sealing means carried at the end of said sleeve and extending inwardly from said sleeve toward the conduit axis to engage the conduit in substantially liquid tight relationship therewith adjacent to the test area and to define a bottom wall of the enclosure; and
    (c) retaining means carried by said sleeve to retain said enclosure around the test area to define an annular chamber for confining a liquid therewithin, said annular chamber having an annular opening at the end of said sleeve opposite the end carrying said sealing means to permit visual observation of liquid within the enclosure.

2. An enclosure for confining a liquid adjacent a test area in a fluid carrying conduit, said enclosure comprising:
    (a) a pair of elongated, arcuate body members hingedly connected along respective longitudinal edges to define a longitudinally openable sleeve to surround a conduit and define an annular space therebetween, said sleeve including longitudinal sealing means positioned between the longitudinal edges of said body members to provide a substantially fluid-tight seal, said sleeve having an open end to define an annular opening when said sleeve is positioned around a conduit to permit visual observation of liquid in the enclosure;

(b) each of said body members including a corresponding semi-annular, inwardly directed radial seal to define a enclosure bottom wall, said radial seals extending toward the conduit axis and adapted to substantially sealingly engage said conduit; and (c) retaining means for maintaining said body members in cooperatively engaging relationship to provide a liquid-retaining sleeve.

3. The enclosure of claim 2 wherein said enclosure includes carrying handles on oppoiste sides thereof.

4. The enclosure of claim 2 wherein said radial seals are substantially liquid impervious.

5. The enclosure of claim 2 wherein said retaining means comprises locking means carried by said body for securely engaging said body means in substantially fluid-tight relationship.

6. The enclosure of claim 5 wherein said locking means is releasable to permit said body members to be separated by pivoting about the hinged connection therebetween.

7. The enclosure of claim 6 wherein said locking means includes an arm pivotally carried by one of said body members, said arm including a loop, and said other body member includes a projecting lug, said loop engagable on said lug to retain said body members in closed relationship.

8. The enclosure of claim 7 wherein said one body member includes a yoke adjacent to the openable longitudinal edge thereof, and a pin extending through said yoke, said arm being pivotally carried by said pin.

9. The enclosure of claim 8 wherein said loop us pivotally carried by said arm at a pivot point spaced radially outwardly of said yoke.

10. The enclosure of claim 9 wherein said pivot pin is spaced from said yoke a distance sufficient to cause said arm to be locked when said enclosure is in closed condition.

11. The enclosure of claim 2 wherein each of said body members includes an inwardly directed flange at one end thereof and each said radial seal is secured to a corresponding one of said flanges.

12. The enclosure of claim 11 wherein said radial seals are secured to said flanges by means of a plurality of bolts that extend through said seals and said flanges.

13. An enclosure for surrounding and engaging a well casing to define an annular chamber therewith, said enclosure comprising:

(a) a pair of similarly configured, curved body members hingedly connected along a pair of respective longitudinal marginal edges thereof to permit said body members to pivotally separate to permit the positioning or removal thereof around a well casing, said body members pivotable to a closed position wherein respective pairs of the longitudinal marginal edges thereof are substantially in engagement to define a sleeve, said sleeve having an inner surface spaced from the outer surface of said well casing to define a substantially annular space therebetween;

(b) longitudinal sealing means carried by at least one of each of said pairs of engaged longitudinal marginal edges to define a substantially liquid-tight seal therebetween;

(c) radial sealing means positioned at one end of each of said body members, said radial sealing means including a substantially semi-annular, resilient transverse seal extending inwardly toward the well casing axis from each of said body members to engage the outer surface of said well casing and define a substantially annular base for said enclosure when said body members are in a closed position and to provide a substantially liquid-tight seal with said well casing, the ends of said body members opposite to the ends having the radial sealing means cooperating with the well casing to define an annular opening to permit visual observation of liquid within the enclosure; and (d) retaining means to hold said body members in engaged condition.

* * * * *